United States Patent
Hasegawa

(10) Patent No.: US 9,137,416 B2
(45) Date of Patent: Sep. 15, 2015

(54) CONTROLLING DEVICE

(71) Applicant: BROTHER KOGYO KABUSHIKI KAISHA, Nagoya-shi, Aichi-ken (JP)

(72) Inventor: Tomohiko Hasegawa, Okazaki (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/263,409

(22) Filed: Apr. 28, 2014

(65) Prior Publication Data
US 2014/0233076 A1 Aug. 21, 2014

Related U.S. Application Data

(63) Continuation of application No. 13/365,724, filed on Feb. 3, 2012, now Pat. No. 8,934,131.

(30) Foreign Application Priority Data

Feb. 18, 2011 (JP) ................. 2011-033641

(51) Int. Cl.
*H04N 1/405* (2006.01)
*H04N 1/387* (2006.01)
(Continued)

(52) U.S. Cl.
CPC ......... *H04N 1/3871* (2013.01); *H04N 1/33315* (2013.01); *H04N 1/3935* (2013.01);
(Continued)

(58) Field of Classification Search
CPC .......... H04N 1/33315; H04N 1/40068; H04N 2201/0094; H04N 2201/33328; H04N 2201/33378; H04N 1/3871; H04N 1/3935; H04N 2201/3252

USPC .......... 358/1.2, 3.06–3.09, 1.9, 2.1, 468, 400, 358/500, 406, 504, 523, 530; 382/298–300, 382/148

See application file for complete search history.

(56) References Cited

U.S. PATENT DOCUMENTS 5,796,928 A 8/1998 Toyomura et al.
7,031,003 B2 4/2006 Nagai et al.
(Continued)

FOREIGN PATENT DOCUMENTS

CN 101193186 A 6/2008
CN 101662558 A 3/2010
(Continued)

OTHER PUBLICATIONS

Office Action issued in related Chinese patent application 201210023771.3, mailed Aug. 20, 2014.
(Continued)

*Primary Examiner* — Thomas D Lee
*Assistant Examiner* — Stephen M Brinich
(74) *Attorney, Agent, or Firm* — Merchant & Gould PC

(57) ABSTRACT

A controlling device may determine an output resolution according to one type of file format selected from a plurality of types of file format. The output resolution may be a resolution of image data to be included in a target file of a generation target. The plurality of types of file format may include a first type of file format and a second type of file format. The controlling device may determine a first resolution as the output resolution in a first case where the selected file format is the first type of file format, and determine a second resolution different from the first resolution as the output resolution in a second case where the selected file format is the second type of file format.

10 Claims, 6 Drawing Sheets

(51) Int. Cl.
- *H04N 1/333* (2006.01)
- *H04N 1/393* (2006.01)
- *H04N 1/40* (2006.01)
- *H04N 1/00* (2006.01)

(52) U.S. Cl.
CPC ........ *H04N1/40068* (2013.01); *H04N 1/00204* (2013.01); *H04N 2201/0081* (2013.01); *H04N 2201/0094* (2013.01); *H04N 2201/3216* (2013.01); *H04N 2201/3252* (2013.01); *H04N 2201/33328* (2013.01); *H04N 2201/33378* (2013.01)

(56) References Cited

U.S. PATENT DOCUMENTS

| | | |
|---|---|---|
| 2002/0167690 A1 | 11/2002 | Fuji |
| 2003/0048487 A1 | 3/2003 | Johnston et al. |
| 2003/0218762 A1 | 11/2003 | Edwards et al. |
| 2004/0056960 A1 | 3/2004 | Hayashi |
| 2004/0105129 A1 | 6/2004 | Kawakami |
| 2005/0104975 A1 | 5/2005 | Hayashi |
| 2005/0206912 A1 | 9/2005 | Megawa |
| 2005/0248778 A1 | 11/2005 | Kim |
| 2006/0039609 A1 | 2/2006 | Takano |
| 2006/0103882 A1 | 5/2006 | Tonegawa |
| 2006/0215910 A1 | 9/2006 | Megawa |
| 2007/0146732 A1 | 6/2007 | Piazza et al. |
| 2007/0257422 A1 | 11/2007 | Suzuki |
| 2007/0273771 A1 | 11/2007 | Hayashi |
| 2007/0285737 A1 | 12/2007 | Takara |
| 2008/0123162 A1 | 5/2008 | Sugiura |
| 2009/0051951 A1 | 2/2009 | Saida |
| 2009/0231598 A1 | 9/2009 | Kimura |
| 2009/0303508 A1 | 12/2009 | Tanaka |
| 2010/0002257 A1 | 1/2010 | Isshiki |
| 2010/0058180 A1 | 3/2010 | Hirayama et al. |
| 2010/0118344 A1 | 5/2010 | Asano |
| 2010/0123926 A1 | 5/2010 | Kitani |
| 2010/0134853 A1 | 6/2010 | Suzuki |
| 2011/0013202 A1 | 1/2011 | Muramatsu |
| 2011/0019229 A1 | 1/2011 | Hayashi et al. |
| 2011/0317227 A1 | 12/2011 | Makishima et al. |
| 2012/0250100 A1 | 10/2012 | Kuraya et al. |
| 2012/0250101 A1 | 10/2012 | Kuraya et al. |
| 2012/0250102 A1 | 10/2012 | Kuraya et al. |
| 2013/0060918 A1 | 3/2013 | Butler et al. |

FOREIGN PATENT DOCUMENTS

| | | |
|---|---|---|
| EP | 1605348 A2 | 12/2005 |
| EP | 2086212 A1 | 8/2009 |
| JP | H01-177258 A | 7/1989 |
| JP | H01-268253 A | 10/1989 |
| JP | H07-177359 A | 7/1995 |
| JP | H09-046512 A | 2/1997 |
| JP | H11-187252 A | 7/1999 |
| JP | H11-261879 A | 9/1999 |
| JP | 2000-125117 A | 4/2000 |
| JP | 2000-209436 A | 7/2000 |
| JP | 2000-307818 A | 11/2000 |
| JP | 2001-022138 A | 1/2001 |
| JP | 2002-142106 A | 5/2002 |
| JP | 2002-335386 A | 11/2002 |
| JP | 2003-046734 A | 2/2003 |
| JP | 2003-219150 A | 7/2003 |
| JP | 2004-363795 A | 12/2004 |
| JP | 2005-005946 A | 1/2005 |
| JP | 2005-278174 A | 10/2005 |
| JP | 2007-122255 A | 5/2007 |
| JP | 2007-274617 A | 10/2007 |
| JP | 2008-034903 A | 2/2008 |
| JP | 2009-182705 A | 8/2009 |
| JP | 2009-219055 A | 9/2009 |
| JP | 2009-296533 A | 12/2009 |
| JP | 2010-056827 A | 3/2010 |
| JP | 2010-120195 A | 6/2010 |

OTHER PUBLICATIONS

Office Action issued in related co-pending U.S. Appl. No. 13/363,325, mailed Jul. 2, 2014.
Office Action issued in related Japanese Office Action 2013-190920, mailed Jul. 1, 2014.
Office Action issued in related Japanese Office Action 2013-134902 mailed Jul. 22, 2014.
Office Action issued in related U.S. Appl. No. 13/363,333, mailed Mar. 21, 2014.
Office Action issued in U.S. Appl. No. 13/363,177, mailed Dec. 23, 2013.
Office Action issued in U.S. Appl. No. 13/363,325, mailed Jan. 17, 2014.
Chinese Office Action issued in CN201210023771.3, mailed Jan. 27, 2014.
European Office Action issued in EP 12 153 356.6, mailed Feb. 7, 2014.
United States Patent and Trademark Office, Final Office Action for U.S. Appl. No. 13/363,333 (related to above-captioned patent application), mailed Sep. 30, 2013.
United States Patent and Trademark Office, Non Final Office Action for U.S. Appl. No. 13/363,325 {related to above-captioned patent application), mailed Jul. 8, 2013.
European Patent Office, Extended European Search Report for EP Patent Application No. 12153342.6 (counterpart of application related to the above-captioned application), mailed Aug. 22, 2013.
European Patent Office, Office Action for European Patent Application No. 12153353.3 (related to above-captioned patent application), mailed Oct. 31, 2013.
Japan Patent Office, Notification of Reasons for Rejection for Japanese Patent Application No. 2011-033641 (counterpart Japanese patent application), mailed Jan. 8, 2013.
European Patent Office, extended European Search Report for European Patent Application No. 12153353.3 (counterpart European patent application), dated Jan. 16, 2013.
Japan Patent Office, Notification of Reasons for Rejection for Japanese Patent Application No. 2011-076309 (counterpart to co-pending U.S. Appl. No. 13/363,333), mailed Feb. 26, 2013.
Japan Patent Office, Notification of Reasons for Rejection for Japanese Patent Application No. 2011-076310 (counterpart to co-pending U.S. Appl. No. 13/363,177), mailed Feb. 26, 2013.
Japan Patent Office, Notification of Reasons for Rejection for Japanese Patent Application No. 2011-076311 (counterpart to co-pending U.S. Appl. No. 13/363,325), mailed Feb. 26, 2013.
European Patent Office, Office Action for European Patent Application No. 12153501.7 (counterpart to above-captioned patent application), dated Mar. 21, 2013.
European Patent Office, Extended European Search Report for European Patent Application No. 12153356.6 (counterpart to co-pending U.S. Appl. No. 13/363,325), dated Apr. 9, 2013.
European Patent Office, extended European Search Report for European Patent Application No. 12153501.7 (counterpart to above-captioned patent application), dated May 3, 2012.
United States Patent and Trademark Office, Non Final Office Action for U.S. Appl. No. 13/363,333 {related to above-captioned patent application), mailed Jun. 17, 2013.
Japan Patent Office, Decision of Rejection for Japanese Patent Application No. 2011-033641 (counterpart to above-captioned patent application), mailed Jun. 25, 2013.
Japan Patent Office, Notification of Reasons for Rejection for Japanese Patent Application No. 2011-076311 (related to above-captioned patent application), mailed Jun. 25, 2013.
Chinese Office Action issued in CN 201210021653.9, mailed Apr. 2, 2014.
Chinese Office Action (CN 201210021653.9) mailed Oct. 31, 2014 ( 24 pages).
European Office Action for corresponding EP Application No. 12153353.3 mailed Jan. 26, 2015 (6 pages).
Office Action issued in related Chinese Patent Application No. 201210023771.3, mailed Feb. 2, 2015.
Extended European Office Action issued in related application EP 12 153 356.6, mailed Jul. 7, 2015.

Table 44

| File Size | File Format | Output Resolution (dpi) |
|---|---|---|
| Large | JPEG | 600 |
| | PDF, XPS | 300 |
| Medium | JPEG | 300 |
| | PDF, XPS | 200 |
| Small | JPEG | 200 |
| | PDF, XPS | 100 |

(Second Embodiment)

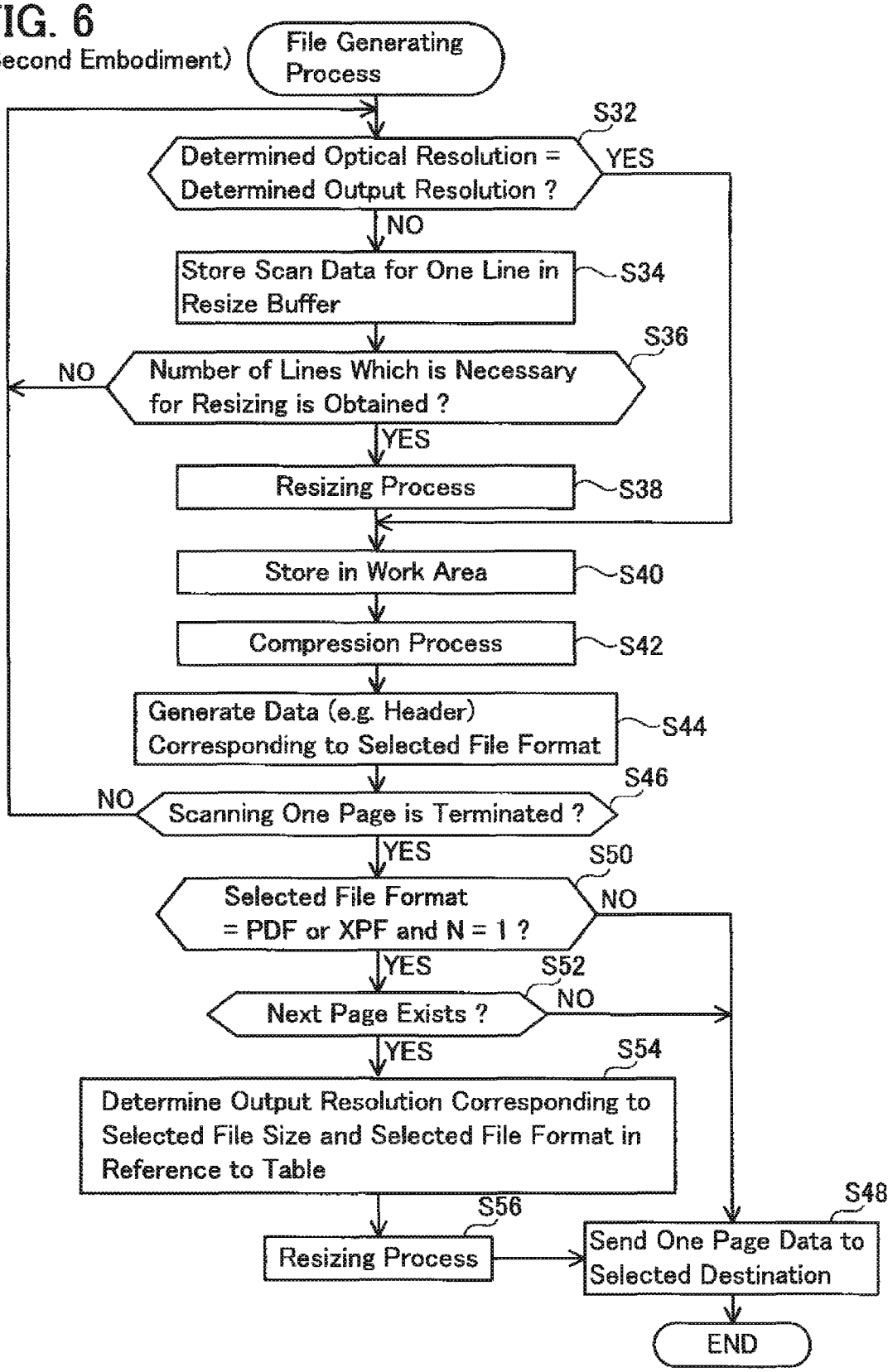

CONTROLLING DEVICE

CROSS-REFERENCE TO RELATED APPLICATIONS

This application is a continuation of U.S. patent application Ser. No. 13/365,724, filed Feb. 3, 2012, which further claims priority to Japanese Patent Application No. 2011-033641 filed on Feb. 18, 2011, the contents of both of which are hereby incorporated by reference into the present application.

TECHNICAL FIELD

The present application relates to a controlling device for controlling a scan performing unit.

DESCRIPTION OF RELATED ART

For example, an image transmitting device that transmits image data to outside is known. In this image transmitting device, a user is able to select one transmission format from a plurality of transmission formats (such as facsimile transmission, scan-to-FTP or scan-to-e-mail), while also being able to select one image quality from a plurality of image qualities (such as ordinary print or fine print). This image transmitting device determines a resolution of image data targeted for transmission corresponding to the transmission format and image quality selected by the user.

SUMMARY

In the technology of the above-mentioned publication, there is a possibility of being unable to suitably determine an output resolution of image data. The present specification discloses a technique that may determine a suitable output resolution.

One technique disclosed in the present application is a controlling device. The controlling device may comprise one or more processors and a memory that stores a computer program including instructions to be executed by the one or more processors. The instructions may cause the one or more processors, when executed by the one or more processors, to function as a determination unit, and a scan controlling unit. The determination unit may be configured to determine an output resolution according to one type of file format selected from a plurality of types of file format. The output resolution may be a resolution of image data to be included in a target file of a generation target. The plurality of types of file format may include a first type of file format and a second type of file format different from the first type of file format. The scan controlling unit may be configured to cause the scan performing unit to perform a scan of an original so as to generate scan data in order to cause a generating unit to generate the target file. The generating unit may be configured to generate the target file including the image data obtained using the scan data. The image data may have the determined output resolution. The determination unit may be configured to determine a first resolution as the output resolution in a first case where the selected file format is the first type of file format, and determine a second resolution different from the first resolution as the output resolution in a second case where the selected file format is the second type of file format.

Furthermore, a control method, a computer program, and a non-transitory computer readable recording medium that stores the computer program for realizing the above-mentioned controlling device are also novel and useful.

BRIEF DESCRIPTION OF DRAWINGS

FIG. 6 is a flow chart of a file generation process of the second embodiment.

EMBODIMENT

First Embodiment (System Configuration)

Figure 1:
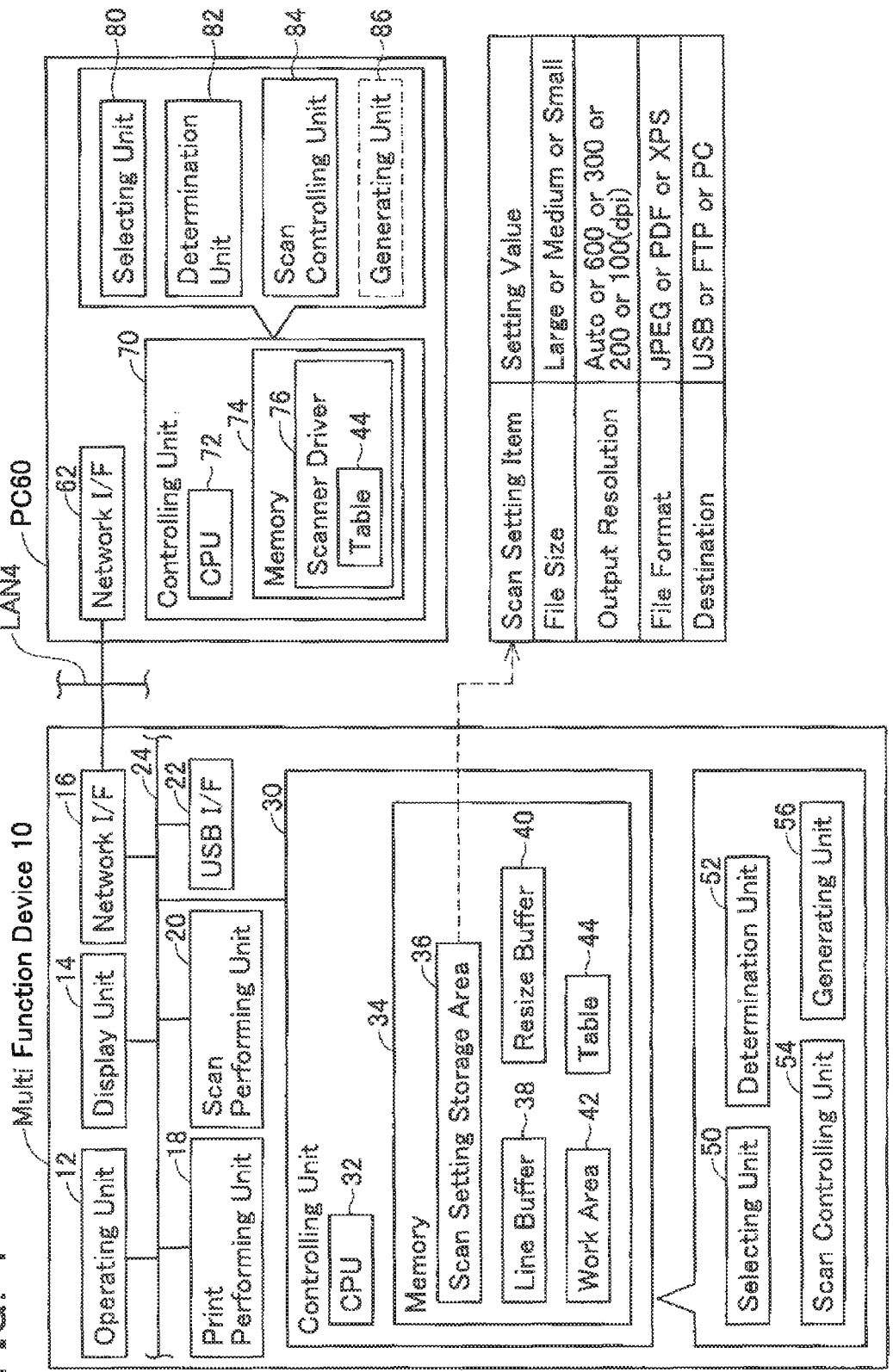
FIG. 1 shows an example of the configuration of a communication system.

As shown in FIG. 1, a communication system 2 is provided with a multi function device 10 (peripheral device of a PC 60) and a PC 60. The multi function device 10 and the PC 60 are connected to a LAN 4. The multi function device 10 and the PC 60 are able to mutually communicate through the LAN 4.

(Configuration of Multi Function Device 10)

The multi function device 10 is able to perform a plurality of functions, including a print function, a scan function and a copy function. The multi function device 10 is provided with an operating unit 12, a display unit 14, a network I/F 16, a print performing unit 18, a scan performing unit 20, a USB I/F 22 and a controlling unit 30. Each of the units 12 to 22 and 30 are connected to a bus line 24.

The operating unit 12 is composed by a plurality of keys. A user is able to input various instructions to the multi function device 10 by operating the operating unit 12. A display unit 14 is a display for displaying various types of information. A network I/F 16 is connected to the LAN 4. The print performing unit 18 is provided with a printing mechanism of an inkjet head type or laser type and the like, and performs printing in accordance with instructions from the controlling unit 30. The scan performing unit 20 is provided with a scanning mechanism such as CCD type or CIS type, and performs scanning of an original in accordance with instructions from the controlling unit 30. A USB memory is connected to the USB I/F 22.

The controlling unit 30 is provided with a CPU 32 and a memory 34. The CPU 32 performs various processes in accordance with a program (not shown) stored in the memory 34. Each of the functions of a selecting unit 50, a determination unit 52, a scan controlling unit 54 and a generating unit 56 is realized by the process performed by the CPU 32 in accordance with the program.

The memory 34 is composed by a non-volatile memory or volatile memory and the like. The memory 34 is provided with a scan setting storage area 36, a line buffer 38, a resize buffer 40 and a work area 42. The memory 34 further stores a table 44 (see FIG. 3). The table 44 is preliminarily stored in the multi function device 10 at the stage when the multi function device 10 is shipped. However, the multi function device 10 may alternatively acquire (namely, install) the table 44 from media (such as USB memory) provided by a vendor of the multi function device 10, or may acquire the table 44 from a server provided by the vendor of the multi function device 10. The contents of data stored in each of the areas 36 to 42 and the contents of the table 44 will be subsequently explained in detail.

(Configuration of PC 60)

The PC 60 is provided with a network I/F 62 and a controlling unit 70. The PC 60 is further provided with an operating unit and display unit not shown. The network IF 62 is connected to the LAN 4.

The controlling unit 70 is provided with a CPU 72 and a memory 74. The CPU 72 performs various process in accordance with a program (such as a scanner driver 76) stored in the memory 74. Each of the functions of a selecting unit 80, a determination unit 82 and a scan controlling unit 84 is realized by the CPU 72 performing processes in accordance with the scanner driver 76. Furthermore, each of the units 80 to 84 is used in a third embodiment to be subsequently described. In addition, a generating unit 86 is used in a fourth embodiment to be subsequently described.

The memory 74 is composed by a non-volatile memory or volatile memory and the like. The memory 74 stores the scanner driver 76 for using the scan function of the multi function device 10. The PC 60 acquires (namely, installs) the scanner driver 76 from media shipped with the multi function device 10. However, the PC 60 may alternatively acquire the scanner driver 76 from a server provided by a vendor of the multi function device 10, or may acquire the scanner driver 76 from a server provided by the vendor of the multi function device 10.

Figure 2:
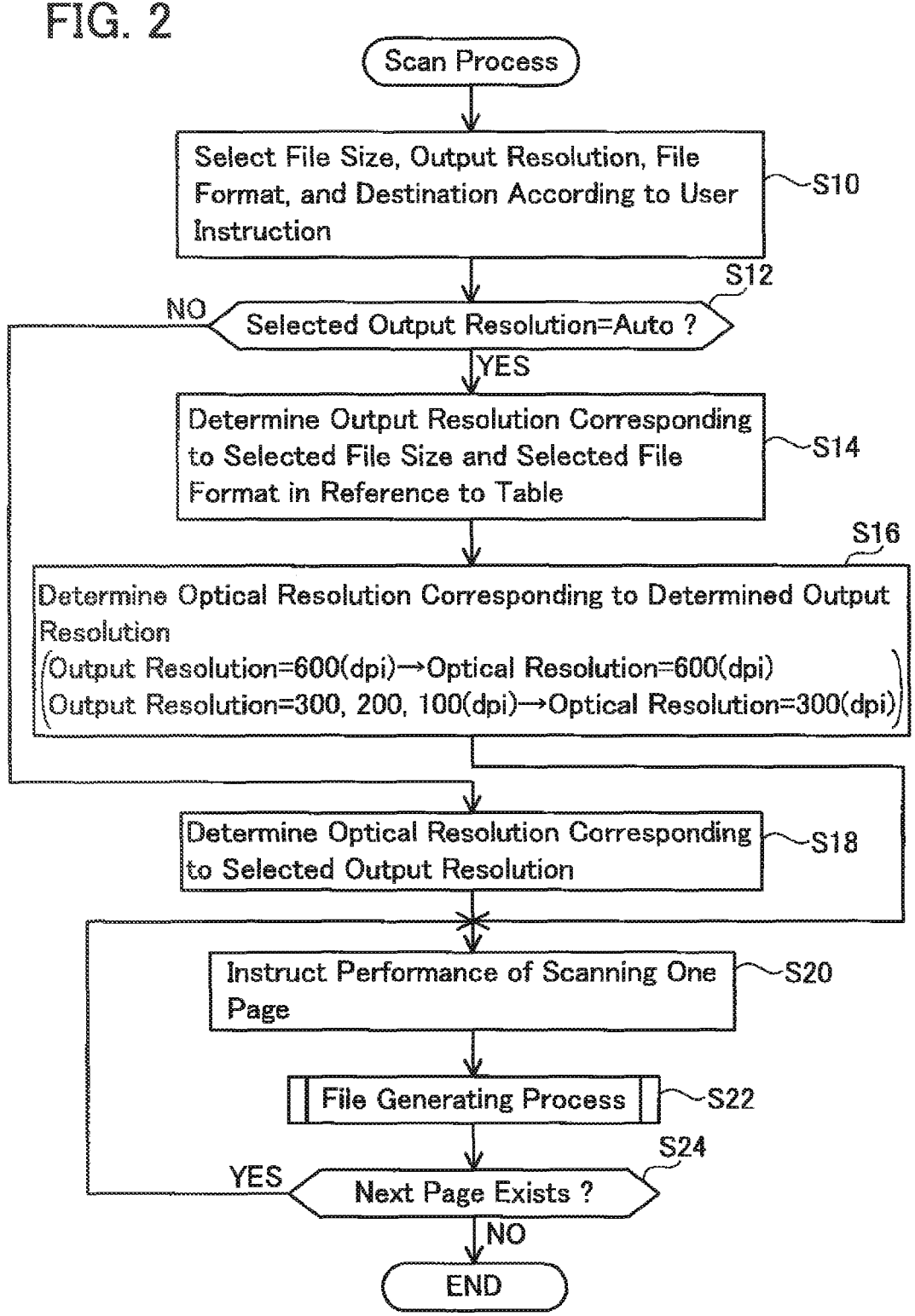
FIG. 2 shows a flow chart of a scan process.

(Scan Process: FIG. 2)

Continuing, an explanation is provided of processes performed by the multi function device 10. After a user has placed an original at a prescribed location on the multi function device 10, the user inputs instructions for performing scanning to the multi function device 10 by operating the operating unit 12 of the multi function device 10. Furthermore, in the present embodiment, it is assumed that the user places one or more of the originals in an auto document feeder (ADF). However, the user may also place the original on a transparent plate. When instructions for performing scanning have been input, the selecting unit 50 (see FIG. 1) causes the display unit 14 to display a designation screen for designating scan settings. In the present embodiment, there is a plurality of scan setting items that contains "file size", "output resolution", "file format" and "destination" as shown in FIG. 1.

(File Size)

File size refers to the file size of a file to be generated (to be referred to as a "target file"). In the present embodiment, three file sizes ("large", "medium" and "small") are employed as settings able to be designated by the user. Furthermore, although three file sizes are employed in the present embodiment, two file sizes (such as "large" and "small") may be employed or four or more file sizes may be employed as a variation thereof.

(Output Resolution)

Output resolution refers to the resolution of the image data contained in the target file. Furthermore, although subsequently described in greater detail, the output resolution is distinguished from the optical resolution used when the scanning is actually performed by the scan performing unit 20. In the present embodiment, five output resolutions (including "Auto", "600 dpi", "300 dpi", "200 dpi" and "100 dpi") are employed as the settings that can be designated by a user. As will be subsequently described, "Auto" is the setting used to allow the multi function device 10 to determine the value of resolution corresponding to file size and file format. Furthermore, although four output resolutions ("600 dpi", "300 dpi", "200 dpi" and "100 dpi") are employed as the output resolutions having specific numerical values in the present embodiment, three to five output resolutions may also be employed in variations thereof.

(File Format)

File format refers to the file format of the target file. More specifically, the file format is specified by a suffix (such as ".jpg", ".pdf" or ".xps") contained in the file name of the target file. Namely, in the case a plurality of files have different suffixes, the plurality of files have different file formats. In the present embodiment, three types of file formats (including "JPEG (Joint Photographic Experts Group)", "PDF (Portable Document Format)" and "XPS (XML Paper Specification)") are employed as settings able to be designated by a user. Furthermore, although the three types of file formats are employed in the present embodiment, two types of file formats or four or more types of file formats may be employed as variations thereof.

Furthermore, files having the "JPEG" file format (to be referred to as "JPEG files") contain image data that has been compressed in accordance with the JPEG compression method (to be referred to as "JPEG data"). In addition, files having the "PDF" file format (to be referred to as "PDF files") and files having the "XPS" file format (to be referred to as "XPS files") also contain JPEG data.

Although to be subsequently described in detail, the compression rate of the JPEG data varies corresponding to the above-mentioned three file sizes ("large", "medium" and "small"). Furthermore, the compression rate is defined in the following manner in the present embodiment. Namely, the data size of the JPEG data (namely, image data after compression) becomes smaller (namely, the degree of compression becomes larger) the higher the compression rate. In other words, the data size of JPEG data (namely, image data after compression) becomes larger (namely, the degree of compression becomes smaller) the lower the compression rate.

In the case a comparatively large file size is designated by the user, JPEG data compressed at a comparatively low compression rate (namely, JPEG data having a comparatively large data size) is generated, while in the case a comparatively small file size is designated by a user, JPEG data compressed at a comparatively high compression rate (namely, JPEG data having a comparatively small data size) is generated. Thus, a difference between the above-mentioned three file sizes is related to the compression rate of image data contained in the target file. In addition, a difference between the above-mentioned three file sizes is related to the data size of JPEG data (namely, image data after compression).

(Destination)

Destination refers to the destination of the target file. In the present embodiment, three types of destinations (including "USB", "FTP (File Transfer Protocol)" and "PC") are employed as settings able to be designated by a user. "USB" refers to transmitting the target file to a USB memory connected to a USB I/F. "FTP" refers to transmitting the target file to a predetermined server. "PC" refers to transmitting the target file to a predetermined PC. Furthermore, although three types of destinations are employed in the present embodiment, two types of destinations or four or more types of destinations (such as employing an e-mail address as a destination) may also be employed as variations thereof.

The user designates one setting value for each of the plurality of scan settings by operating the operating unit 12 while the above-mentioned designation screen is displayed. In this case, in S10 of FIG. 2, the selecting unit 50 selects one file size among the three file sizes, selects one output resolution among the five output resolutions, selects one type of file format among the three types of file formats, and selects one type of destination among the three types of destinations in accordance with designations made by the user (in other words, user instructions). In S10, the selecting unit 50 further stores the selected file size, the selected output resolution, the selected file format and the selected destination in the scan setting storage area 36.

Next, in S12, the determination unit 52 (see FIG. 1) determines whether or not the selected output resolution stored in the scan setting storage area 36 is "Auto". In the case the selected output resolution is "Auto", the determination unit 52 determines the result of the determination of S12 to be YES and process proceeds to S14. On the other hand, in the case the selected output resolution is not "Auto", namely in the case the selected output resolution is any of the four output resolutions having specific numerical values, the determination unit 52 determines the result of the determination of S12 to be NO and process proceeds to S18.

Furthermore, as will be subsequently described, in the case the selected output resolution is "Auto", the determination unit 52 determines the output resolution of the JPEG data contained in the target file corresponding to the selected file format and the selected file size. On the other hand, in the case the selected output resolution is not "Auto", the determination unit 52 does not determine the output resolution corresponding to the selected file format and so on, but rather determines the output resolution designated by the user (namely, the selected output resolution stored in the scan setting storage area 36) as the output resolution of the JPEG file contained in the target file. According to this configuration, the multi function device 10 can determine a suitable output resolution corresponding to the mode in which the multi function device 10 per se is to operate (namely, corresponding to whether not the mode is "Auto").

Figure 3:
FIG. 3 shows an example of a table representing the relationship among file size, file format and output resolution.

In S14, the determination unit 52 determines output resolution by referring to the table 44 in the memory 34. As shown in FIG. 3, the table 44 includes data representing the relationship among file size, file format and output resolution. The data in the table 44 is set so that the output resolution becomes higher the larger the file size. In other words, the data in the table 44 is set so that the output resolution becomes lower the smaller the file size.

In addition, the data in the table 44 is set so that the output resolutions corresponding to "PDF" and "XPS" are lower than the output resolution corresponding to "JPEG". "PDF" and "XPS" are file formats having the page concept (namely, file formats able to contain the image data of a plurality of pages). In contrast, "JPEG" is a file format that does not have the page concept (namely, a file format that is unable to contain the image data of a plurality of pages). Thus, the data in the table 44 is set so that the output resolution corresponding to the file format having the page concept ("PDF" or "XPS") is lower than the output resolution corresponding to the file format not having the page concept ("JPEG").

In S14, the determination unit 52 specifies the output resolution corresponding to the selected file size and the selected file format stored in the scan setting storage area 36 from the table 44. As a result, the determination unit 52 can determine the output resolution of the JPEG data contained in the target file. Furthermore, the determination unit 52 does not determine the output resolution corresponding to the selected destination. Namely, the output resolution is not dependent on the selected destination.

Furthermore, as is clear from FIG. 3, the lower output resolution ("200 dpi") of the two output resolutions ("300 dpi" and "200 dpi") corresponding to the "medium" file size is equal to or greater than the higher resolution ("200 dpi") of the two output resolutions corresponding to the "small" file size ("200 dpi" and "100 dpi"). Moreover, the lower output resolution ("300 dpi") of the two output resolutions ("600 dpi" and "300 dpi") corresponding to the "large" file size is equal to or greater than the higher resolution ("300 dpi") of the two output resolutions corresponding to the "medium" file size ("300 dpi" and "200 dpi"). The use of the table 44 configured in this manner enables the determination unit 52 to determine a suitable output resolution corresponding to the selected file size. Namely, the occurrence of a situation in which, for example, the output resolution determined in the case a comparatively large file size (such as a "large" file size) is selected becomes lower than the output resolution determined in the case a comparatively small file size (such as a "small" file) is selected, is prevented.

Following completion of S14, in S16, the determination unit 52 determines the optical resolution corresponding to the selected output resolution determined in S14. In the present embodiment, the relationship between the output resolution and the optical resolution is determined in advance. More specifically, in the case the selected output resolution is "600 dpi", the determination unit 52 determines the optical resolution to be "600 dpi". In addition, in the case the selected output resolution is "300 dpi", "200 dpi" or "100 dpi", the determination unit 52 determines the optical resolution to be "300 dpi". Generally speaking, the determination unit 52 determines the optical resolution so as to be as low as possible under the constraint that the optical resolution is equal to or greater than output resolution. Furthermore, the optical resolution is determined to be any value (such as "600 dpi" or "300 dpi") equivalent to 1/X times (where, X is an integer of 1 or more) a predetermined value ("600 dpi" in the present embodiment). Process proceeds to S20 following completion of S16.

In S18 that is performed in the case of NO in S12, the determination unit 52 determines the optical resolution corresponding to the selected output resolution stored in the scan setting storage area 36. The relationship between the output resolution and optical resolution is the same as in S16. Process proceeds to S20 following completion of S18.

In S20, the scan controlling unit 54 (see FIG. 1) instructs the scan performing unit 20 to scan one page of the original. More specifically, the scan controlling unit 54 transmits a prescribed signal to the scan performing unit 20. In particular, the scan controlling unit 54 instructs the scan performing unit 20 to scan the original at the determined optical resolution determined in S16 or S18. As a result, the scan performing unit 20 scans the original at the determined optical resolution and generates one page of scan data. As a result, one page of scan data having the determined optical resolution (for example, "600 dpi") is generated.

Furthermore, the scan performing unit 20 transmits one line of scan data to the controlling unit 30 for each line of scan data generated. One line of scan data is the data of a plurality of pixels along the direction in which a plurality of image sensors provided by the scan performing unit 20 are arranged. The controlling unit 30 stores individual lines of scan data in the line buffer 38 each time one line of scan data is received. Process proceeds to S22 following completion of S20.

(File Generating Process: S22)

Figure 4:
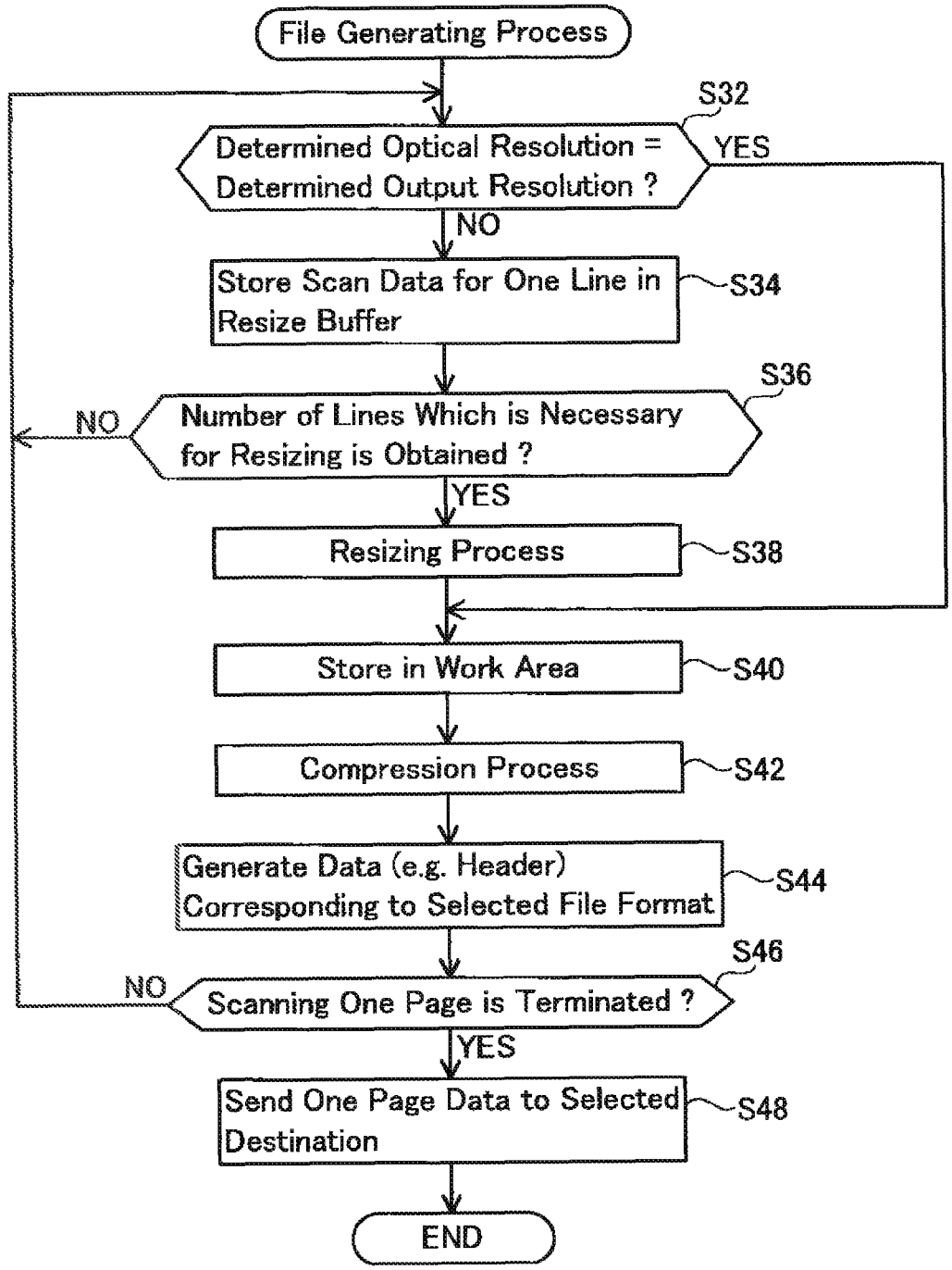
FIG. 4 shows a flow chart of a file generating process.

In S22, the generating unit 56 (see FIG. 1) performs a file generating process. As shown in FIG. 4, in S32, the generating unit 56 determines whether or not the determined optical resolution determined in S16 or S18 matches the determined output resolution. Furthermore, the "determined output resolution" here is the output resolution determined in S14 in the case of YES in S12 of FIG. 2, and is the output resolution designated by the user in the case of NO in S12 of FIG. 2. In the case the determined optical resolution does not match the determined output resolution (NO in S32), S34 to S38 are performed, while in the case the determined optical resolution matches the determined output resolution (YES in S32), S34 to S38 are skipped and process proceeds to S40.

In S34 to S38, the generating unit 56 performs process for resizing image data having the determined optical resolution to image data having the predetermined output resolution. In S34, the generating unit 56 stores a singe line of scan data stored in the line buffer 38 in the resize buffer 40. As a result, the generating unit 56 is able to vacate the line buffer 38. Process proceeds to S36 following completion of S34.

In the present embodiment, a bilinear method is used for the resizing method. In this case, resizing can be performed if there are two lines of scan data. In S36, the generating unit 56 determines whether or not two lines of scan data necessary for resizing are stored in the resize buffer 40. In the case two lines of scan data are not stored in the resize buffer 40 (NO in S36), the generating unit 56 repeats S32 and S34 and stores the next line of scan data in the resize buffer 40. Process proceeds to S38 in the case two lines of scan data are stored in the resize buffer 40 (YES in S36).

In S38, the generating unit 56 performs resizing using the two lines of scan data stored in the resize buffer 40. Namely, the generating unit 56 resizes (namely, converts) the scan data having the determined optical resolution to scan data having the determined output resolution. Process proceeds to S40 following completion of S38.

In S40 that is performed after going through S38, the generating unit 56 stores the resized scan data in the work area 42. As a result, the generating unit 56 is able to vacate the resize buffer 40. Moreover, in S40 that is performed in the case of YES in S32, the generating unit 56 stores one line of scan data stored in the line buffer 38 (namely, scan data that has not been resized) in the work area 42. As a result, the generating unit 56 is able to vacate the line buffer 38.

Next, in S42, the generating unit 56 performs compression process corresponding to the selected file size stored in the scan setting storage area 36 using the scan data stored in the work area 42 in S40. Furthermore, in S42, the generating unit 56 uses the JPEG compression method. In the case the selected file size is "large", the generating unit 56 compresses the scan data at a first compression rate, in the case the selected file size is "medium", the generating unit compresses the scan data at a second compression rate higher than the first compression rate, and in the case the selected file size is "small", the generating unit 56 compresses the scan data at a third compression rate higher than the second compression rate. JPEG data is generated as a result thereof.

Furthermore, in the case the required number of lines of scan data are not stored in the work area 42 when the process of S42 is to be performed, the generating unit 56 skips the process of S42 until the required number of lines of scan data are obtained.

Next, in S44, the generating unit 56 generates data corresponding to the selected file format stored in the scan setting storage area 36. Furthermore, the process of S44 is performed as is required. Namely, the generating unit 56 skips the process of S44 unless it is necessary to generate data when the process of S44 is to be performed.

For example, in the case the selected file format is "JPEG", the generating unit 56 generates a file name that includes the JPEG suffix (".jpg") or generates a JPEG header and footer and the like in S44. In addition, in the case the selected file format is "PDF", for example, the generating unit 56 generates a file name that includes the PDF suffix (".pdf") or generates a JPEG header and footer, PDF header and footer or data indicating a page number and the like in S44. In addition, in the case the selected file format is "XPS", for example, the generating unit 56 generates a file name that includes the XPS suffix (".xps") or generates a JPEG header and footer, XPS header and footer, or data indicating a page number and the like in S44.

Next, in S46, the generating unit 56 determines whether scanning of one page of the original has been completed. In the case data indicating that scanning of one page of the original has been completed is received from the scan performing unit 20, the generating unit 56 determines the result of the determination of S46 to be YES and process proceeds to S48. On the other hand, in the case data indicating that scanning of one page of the original has been completed is not received from the scan performing unit 20 (NO in S46), the generating unit 56 returns to S32 and performs process on the next line of scan data.

In S48, the generating unit 56 transmits one page of data, including JPEG data generated in S42 and file name and other data generated in S44 to the selected destination (USB memory, prescribed server or prescribed PC) stored in the scan setting storage area 36.

When the process of S32 to S48 is performed, the target file is stored at the selected destination. The target file has the selected file format. Moreover, the target file contains JPEG data that has the selected output resolution and has been compressed at the compression rate corresponding to the selected file size.

When the file generating process of FIG. 4 is completed, the controlling unit 30 determines whether or not a next page of the original that is targeted for scanning exists in S24 of FIG. 2. In the case data indicating that scanning of all pages of the original targeted for scanning has been completed is not received from the scan performing unit 20, the controlling unit 30 determines the result of the determination of S24 to be YES, and process proceeds to S20. As a result, in S20, the scan controlling unit 54 instructs the scan performing unit 20 to scan the next page of the original. In S22, the generating unit 56 then generates JPEG data representing the next page of the original and transmits that JPEG data to the selected destination.

Furthermore, as has been previously described, "JPEG" data does not have a page concept. Thus, in the case of scanning two or more pages of an original, for example, a single JPEG file representing one page of the original is generated for each page of the original. Namely, in the case the selected file format is "JPEG" and Y pages of an original (where, Y is an integer of 2 or more) are scanned, the generating unit 56 generates Y number of JPEG files having different file names.

On the other hand, "PDF" and "XPS" data have a page concept. Thus, in the case the selected file format is "PDF" or "XPS" and Y page of an original (where, Y is an integer of 2 or more) are scanned, the generating unit 56 generates a single file (PDF file or XPS file) containing Y pages of JPEG data representing Y pages of the original.

Furthermore, in the case data indicating that scanning of all pages of the original has been completed is received from the scan performing unit 20, the controlling unit 30 determines the result of the determination of S24 to be NO and ends the scan process.

(Effects of the Present Embodiment)

According to the present embodiment, the multi function device 10 determines an output resolution of JPEG data contained in a target file corresponding to a selected file format and a selected data size. Thus, the multi function device 10 is able to determine a suitable output resolution. In particular, in the present embodiment, in the case the selected file format is "JPEG", which does not have a page concept, the multi function device 10 determines a comparatively high resolution for the output resolution, while in the case the selected file format is "PDF" or "XPS", which has a page concept, the multi function device 10 determines a comparatively low resolution for the output resolution. For example, in the case a "PDF" or "XPS" target file is generated, there is the possibility that the target file contains JPEG data representing a large number of pages. In consideration of this possibility, in the present embodiment, the output resolution of the JPEG data contained in the "PDF" or "XPS" target file is set comparatively low. As a result, in the case the target file contains JPEG data representing a large number of pages, the file size of the target file is prevented from becoming excessively large.

(Correspondence)

The controlling unit 30 of the multi function device 10 is an example of a "controlling device". "PDF" or "XPS" is an example of a "first type of file format", while "JPEG" is an example of a "second type of file format". Furthermore, as shown in table 44 of FIG. 3, the file sizes of "large" and "medium" are examples of a "first file size" and a "second file size", respectively. In this case, "300 dpi" corresponding to a "large" file size and "PDF (or XPS)" file format is an example of a "first resolution", while "600 dpi" corresponding to a "large" file size and a "JPEG" file format is an example of a "second resolution". In addition, "200 dpi" corresponding to a "medium" file size and a "PDF (or XPS)" file format is an example of a "third resolution", while "300 dpi" corresponding to a "medium" file size and a "JPEG" file format is an example of a "fourth resolution". In addition, a mode in which the selected output resolution is "Auto" and a mode in which the selected output resolution is that other than "Auto" are examples of a "first mode" and a "second mode", respectively.

Second Embodiment

The following provides an explanation of differences between the first embodiment and the second embodiment. In the first embodiment, in the case the selected file format is "PDF" or "XPS", the determination unit 52 determines a comparatively low resolution for the output resolution regardless of number of pages of the original targeted for scanning. In the present embodiment, in the case the selected file format is "PDF" or "XPS", the determination unit 52 (1) determines a comparatively low resolution for the output resolution in the case the scan performing unit 20 is to scan multiple pages of the original, or (2) determines a comparatively high resolution for the output resolution in the case the scan performing unit 20 is to scan only one page of the original.

Figure 5:
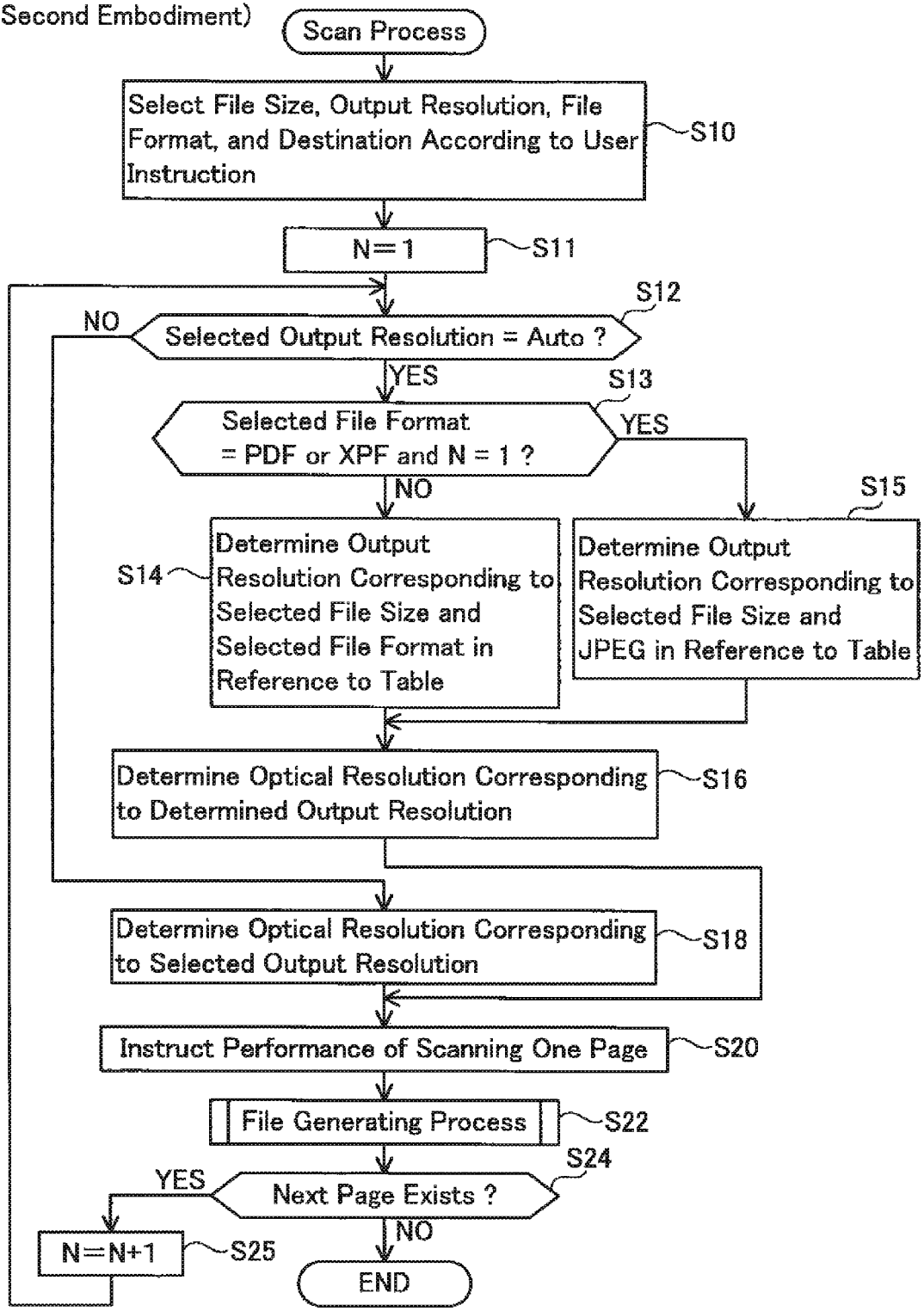
FIG. 5 shows a flow chart of a scan process of a second embodiment.

(Scan Process: FIG. 5)

The following provides an explanation of the contents of the scan process of the present embodiment with reference to FIG. 5. Furthermore, the same reference symbols as those used in FIG. 2 are used in FIG. 5 with respect to those processes that are the same as those of the first embodiment. Following completion of S10, the controlling unit 30 sets N to 1 in S11 and process proceeds to S12. In the case of YES in S12, process proceeds to S13.

In S13, the determination unit 52 determines whether the selected file format is "PDF" or "XPS" and then determines whether or not N=1. In the case the selected file format is "JPEG" or in the case N=2 or more, the determination unit 52 determines the result of the determination of S13 to be NO and process proceeds to S14. On the other hand, in the case of YES in S13, process proceeds to S15.

In S15, the determination unit 52 specifies an output resolution corresponding to the selected file size and "JPEG" from the table 44. For example, even in the case the selected file size is "large" and the selected file format is "PDF" or "XPS", the determination unit 52 determines a comparatively large resolution of "600 dpi" corresponding to the "large" file size and the "JPEG" file format (see FIG. 3). Following completion of S15, process proceeds to S16. S16 to S20 are the same as in the first embodiment.

(File Generating Process: FIG. 6)

Continuing, an explanation is provided of the contents of the file generating process (process of S22 of FIG. 5) of the present embodiment with reference to FIG. 6. Furthermore, the same reference symbols as those used in FIG. 4 are used in FIG. 6 with respect to those processes that are the same as those of the first embodiment. S32 to S46 are the same as in the first embodiment. In the case of YES in S46, the generating unit 56 determines whether the selected file format is "PDF" or "XPS" and whether or not N=1 in S50. In the case of YES in S50, process proceeds to S52, while in the case of NO in S50, process proceeds to S48.

In S52, the generating unit 56 determines whether or not the next page of the original targeted for scanning exists. The process of S52 is the same as that of S24 of FIG. 2. In the case of YES in S52, process proceeds to S54, while in the case of NO in S52, process proceeds to S48.

In S54, the determination unit 52 determines the output resolution by specifying an output resolution corresponding to the selected file size and the selected file format from the table 44 and determines the output resolution. The process of S54 is the same as that of S14 of FIG. 5. For example, in the case N=1, the selected file size is "large" and the selected file format is "PDF" or "XPS", the output resolution of "600 dpi" corresponding to the "large" file size and the "JPEG" file format is determined in S15 of FIG. 5. In the case of this example, the output resolution of "300 dpi" corresponding to the "large" file size and the "PDF, XPS" file format is determined in S54 (see FIG. 3).

Next, in S56, the generating unit 56 performs resizing on the JPEG data generated in S42. First, the generating unit 56 generates scan data by expanding the JPEG data. This scan data has the output resolution determined in S15 (for example, "600 dpi"). Next, the generating unit 56 resizes (namely, converts) the scan data having the output resolution determined in S15 (for example, "600 dpi") to scan data having the output resolution determined in S54 (for example, "300 dpi"). Moreover, the generating unit 56 generates JPEG data by compressing the resized scan data. As a result, one page of JPEG data is generated that has the output resolution determined in S54. Following completion of S56, process proceeds to S48.

In S48 performed after going through S56, the generating unit 56 transmits one page of data containing the JPEG data generated in S56 and data such as file name generated in S44 to the selected destination. On the other hand, in S48 performed without going through S56, the generating unit 56 transmits one page of data containing the JPEG data generated in S42 and data such as file name generated in S44 to the selected destination.

Following completion of the file generating process of FIG. 6, the controlling unit 30 determines whether or not the next page of the original targeted for scanning exists in S24 of FIG. 5. In the case of YES in S24, the controlling unit 30 calculates a new value for N by adding "1" to the current value of N in S25 after which process returns to S12. In this case, since N has become equal to or greater than 2, a determination of NO is made in S13 and process proceeds to S14. Namely, starting with the second page and beyond, the output resolution is determined using the technique of S14 instead of determining the output resolution using the technique of S15.

In the present embodiment, the same effects as those of the first embodiment can be obtained. Moreover, in the present embodiment, the determination unit 52 changes the output resolution corresponding to the number of pages scanned in the case the selected file format is "PDF" and "XPS". More specifically, in the case scanning is performed on a plurality of pages of an original, since the determination of YES is made in S52 of FIG. 6, a comparatively low output resolution determined in S54 of FIG. 6 (for example, "300 dpi") is used as the resolution of the first page of JPEG data. Moreover, the resolution of the second and subsequent pages of JPEG data and beyond has the comparatively low output resolution determined in S14 of FIG. 5. As a result, the file size of the target file can be prevented from becoming excessively large. On the other hand, in the case of scanning only one page of the original, since a determination of NO is made in S52 of FIG. 5, a comparatively high output resolution determined in S15 of FIG. 5 (for example, "600 dpi") is used. As a result, an image having high resolution can be provided to a user. According to this configuration, in the case a file format having a page concept is selected, the determination unit 52 is able to determine a suitable output resolution corresponding to the number of pages scanned.

Third Embodiment

In the first and second embodiments, a user inputs instructions for performing scanning to the multi function device 10 by operating the operating unit 12 of the multi function device 10. Namely, the first and second embodiments are examples of so-called push scanning. In the third embodiment, after the user has placed an original at a prescribed location on the multi function device 10, the user inputs instructions for performing scanning to the PC 60 by operating an operating unit (not shown) of the PC 60. In this case, the PC 60 transmits the instructions for performing scanning to the multi function device 10 in accordance with the scanner driver 76. Namely, the third embodiment is an example of so-called pull scanning.

(Scan Process of Third Embodiment)

In the present embodiment, the selecting unit 80 of the PC 60 (see FIG. 1) displays a designation screen for allowing the user to designate scan settings on the display unit 14. The user then designates one setting for each of the plurality of scan settings by operating the operating unit of the PC 60. In this case, the selecting unit 80 performs the process of S10 of FIGS. 2 and 5 in the same manner as in the first embodiment. Furthermore, in the present embodiment, the selected file size and so on are stored in the memory 74 of the PC 60 in S10.

Next, the determination unit 82 of the PC 60 (see FIG. 1) performs the process of S12 to S18 of FIGS. 2 and 5. Furthermore, in S14, the determination unit 82 refers to the table 44 (see FIG. 3) contained in the scanner driver 76. Next, in S20, the scan controlling unit 84 of the PC 60 (see FIG. 1) instructs the multi function device 10 to scan the original by transmitting a prescribed signal to the multi function device 10. In S20, the scan controlling unit 84 instructs the multi function device 10 to scan the original at the determined optical resolution determined in S16 or S18. Moreover, in S20, the scan controlling unit 84 notifies the multi function device 10 of the selected output resolution, the selected file size, the selected file format and the selected destination.

As a result, the original is scanned by the multi function device 10, and the generating unit 56 and so on of the multi function device 10 performs the file generating process (see FIGS. 4 and 6) of S22 of FIGS. 2 and 5 in the same manner as in the first embodiment. As a result, a target file is generated and the target file is stored at the selected destination.

The same effects as the first embodiment can be obtained by the present embodiment as well. In the present embodiment, the PC 60 is provided with the selecting unit 80, the determination unit 82 and the scan controlling unit 84, and the multi function device 10 is provided with the generating unit 56. Furthermore, in the present embodiment, the multi function device 10 and the PC 60 are examples of a "scan performing unit" and a "controlling device", respectively.

Fourth Embodiment

In the present embodiment, the PC 60 is provided with the selecting unit 80, the determination unit 82, the scan controlling unit 84 and the generating unit 86. The process of S10 to S20 of FIG. 2 is the same as that of the third embodiment. In the present embodiment, the multi function device 10 transmits one line of scan data to the PC 60 each time one line of scan data is generated. The generating unit 86 and so on of the PC 60 perform the file generating process of S22 of FIGS. 2 and 5 (see FIGS. 4 and 6) in the same manner as in the first embodiment. As a result, a target file is generated and the target file is stored at the selected destination.

The same effects as the first embodiment can be obtained by the present embodiment as well. Furthermore, in the present embodiment, the multi function device 10 and the PC 60 are examples of a "scan performing unit" and a "controlling device", respectively.

(Variation 1)

The multi function device 10 may be provided with the selecting unit 50, the determination unit 52 and the scan controlling unit 54, and the PC 60 may be provided with the generating unit 86. In this case, each of the units 50 to 54 of the multi function device 10 perform the process of S10 to S20 of FIGS. 2 and 5, and transmit one line of scan data to the PC 60 each time one line of scan data is generated. The generating unit 86 and so on of the PC 60 performs the file generating process (see FIGS. 4 and 6) of S22 of FIGS. 2 and 5.

(Variation 2)

The multi function device 10 may be provided with the selecting unit 50 and the generating unit 56, and the PC 60 may be provided with the determination unit 82 and the scan controlling unit 84. In this case, the selecting unit 50 of the multi function device 10 performs the process of S10 of FIGS. 2 and 5, and then notifies the selected file size and so on to the PC 60. Each of the units 82 and 84 of the PC 60 perform the process of S12 to S20 of FIGS. 2 and 5. The generating unit 56 and so on of the multi function device 10 perform the file generating process (see FIGS. 4 and 6) of S22 of FIGS. 2 and 5.

As has been previously described, various examples can be considered with respect to which device the selecting unit, determination unit, scan controlling unit and generating unit are provided. Generally speaking, the controlling device is at least provided with the determination unit and the selecting unit.

(Variation 3)

One of either the multi function device 10 and the PC 60 may perform a portion of the plurality of processes of FIGS. 4 and 6 (for example, S32 to S38), while the other of the multi function device 10 and the PC 60 may perform the remainder of the processes (for example, process starting with S40). Generally speaking, the generating unit is provided while distributed among two or more devices.

(Variation 4)

In each of the above-mentioned embodiments, data in the table 44 is set so that the output resolution corresponding to "PDF" and "XPS" is lower than the output resolution corresponding to "JPEG" (see FIG. 3). Alternatively, the data in the table 44 may also be set so that the output resolution corresponding to "JPEG" is lower than the output resolution of "PDF" and "XPS". Generally speaking, in the case the first type of file format is a file format having a page concept and the second type of data format is a file format not having a page concept, the first resolution may be higher than the second resolution. A file format having a page concept has a high possibility of containing characters. If the resolution of an image containing characters is low, a user may easily perceive the image to be of low image quality. Setting the first resolution to be comparatively high makes it possible to prevent the user from perceiving the image to be of low image quality.

(Variation 5)

A determination unit (namely, the determination unit 52 and/or the determination unit 82) may determine output resolution in the manner of each of the above-mentioned embodiments (generally speaking, so that the first resolution is lower than the second resolution) in the case a file size priority mode is selected by a user, and may determine output resolution in the manner of the above-mentioned Variation 4 (generally speaking, so that the first resolution is higher than the second resolution) in the case an image quality priority mode is selected by the user. According to this configuration, a suitable output resolution can be determined corresponding to the mode selected by the user.

(Variation 6)

In each of the above-mentioned embodiments, "PDF" or "XPS" is an example of a "first type of file format". Alternatively, the "first type of file format" may also be another format having a page concept (such as TIFF or JPEGXR). In addition, in each of the above-mentioned embodiments, "JPEG" is an example of a "second type of file format". Alternatively, the "second type of file format" may also be another format that does not have a page concept (such as PNG).

(Variation 7)

In each of the above-mentioned embodiments, a determination unit (namely, the determination unit 52 and/or the determination unit 82) determines output resolution corresponding to the selected file format and the selected file size. Alternatively, the determination unit may also determine output resolution corresponding to the selected file format only. Furthermore, the determination unit may determine output resolution corresponding to the selected file size only. In addition, the determination unit may determine output resolution corresponding to not only the selected file format and/or the selected file size, but also corresponding to another indicator (such as a network communication speed).

(Variation 8)

In each of the above-mentioned embodiments, a difference between a plurality of file sizes including "large", "medium" and "small" is related to the compression rate of image data contained in a target file, namely the data size of JPEG data. Alternatively, the compression rate of the image data may be made to be the same regardless of which of the plurality of file sizes is selected. In this case, the difference between the plurality of file sizes may be related to, for example, the data size of an ICC profile contained in the target file.

(Variation 9)

Although the PC 60 is an example of a "controlling device" in the above-mentioned second and third embodiments, the "controlling device" may also be, for example, a cell phone or PDA and the like.

(Variation 10)

In each of the above-mentioned embodiments, functions of each of the units 50 to 54 and 80 to 86 are realized by the CPU 32 or the CPU 72 performing process in accordance with a program. However, at least one of each of the units 50 to 54 and 80 to 86 may also be realized with hardware such as a logic circuit.

The invention claimed is:

1. A controlling device for controlling a scan performing unit, the controlling device comprises:
   one or more processors; and
   a memory that stores a computer program including instructions to be executed by the one or more processors,
   wherein the instructions cause the one or more processors, when executed by the one or more processors, to function as:
   a determination unit configured to determine an output resolution according to one type of file format selected from a plurality of types of file format, the output resolution being a resolution of image data to be included in a target file of a generation target, the plurality of types of file format including a first type of file format and a second type of file format different from the first type of file format; and
   a scan controlling unit configured to cause the scan performing unit to perform a scan of an original so as to generate scan data in order to cause a generating unit to generate the target file, the generating unit configured to generate the target file including the image data obtained using the scan data, the image data having the determined output resolution,
   wherein the determination unit is configured to
   determine a first resolution as the output resolution in a first case where the selected file format is the first type of file format, and
   determine a second resolution different from the first resolution as the output resolution in a second case where the selected file format is the second type of file format,
   wherein the first type of file format being a file format having a page concept,
   wherein, in the first case that the scan performing unit is to perform a scan of Y pages of an original, where Y is integer of 2 or more, the scan controlling unit is configured to cause the generating unit to generate a single target file containing Y pages of image data representing Y pages of the original.

2. The controlling device as in claim 1, wherein
   the determination unit is configured to determine the output resolution according to the selected file format in a case where the controlling device is to operate in a first mode,
   the determination unit is configured to determine the output resolution, without determining the output resolution according to the selected file format, in a case where the controlling device is to operate in a second mode different from the first mode.

3. The controlling device as in claim 2, wherein
the determination unit is configured to determine a resolution designated by a user as the output resolution, in the case where the controlling device is to operate in the second mode.

4. The controlling device as in claim 1, wherein
the instructions cause the one or more processors, when executed by the one or more processors, to further function as:
a selecting unit configured to select the one type of file format from among the plurality of types of file format,
wherein the determination unit is configured to determine the output resolution according to the selected file format selected by the selecting unit.

5. The controlling device as in claim 1, wherein
the instructions cause the one or more processors, when executed by the one or more processors, to further function as:
the generating unit.

6. The controlling device as in claim 1, wherein the first resolution is lower than the second resolution.

7. A controlling device for controlling a scan performing unit, the controlling device comprises:
one or more processors; and
a memory that stores a computer program including instructions to be executed by the one or more processors,
wherein the instructions cause the one or more processors, when executed by the one or more processors, to function as:
a format determination unit configured to determine a type of file format selected from a plurality of types of file format; and
a scan controlling unit configured to cause the scan performing unit to perform a scan of an original so as to generate scan data in order to cause a generating unit to generate a target file of a generation target, the generating unit configured to generate the target file including the image data obtained using the scan data,
wherein, in a first case that the determined type of file format is a format having a page concept and that the scan performing unit is to perform a scan of Y pages of an original, where Y is integer of 2 or more, the scan controlling unit is configured to cause the generating unit to generate the target file including first image data obtained using the scan data, the first image data having a first resolution, and
wherein, in a second case that the determined type of file format is the format having a page concept and that the scan performing unit is to perform a scan of single page of an original, the scan controlling unit is configured to cause the generating unit to generate the target file including second image data obtained using the scan data, the second image data having a second resolution.

8. The controlling device as in claim 7, wherein
the first resolution is lower than the second resolution.

9. A non-transitory computer readable recording medium including a computer program for a controlling device configured to control a scan performing unit, the computer program including instructions for causing one or more processors mounted on the controlling device to perform:
determining an output resolution according to one type of file format selected from a plurality of types of file format, the output resolution being a resolution of image data to be included in a target file of a generation target, the plurality of types of file format including a first type of file format and a second type of file format different from the first type of file format; and
causing the scan performing unit to perform a scan of an original so as to generate scan data in order to cause a generating unit to generate the target file, the generating unit configured to generate the target file including the image data obtained using the scan data, the image data having the determined output resolution,
wherein the determining the output resolution includes
determining a first resolution as the output resolution in a first case where the selected file format is the first type of file format, and
determining a second resolution different from the first resolution as the output resolution in a second case where the selected file format is the second type of file format,
wherein the first type of file format being a file format having a page concept,
wherein, in the first case that the scan performing unit is to perform a scan of Y pages of an original, where Y is integer of 2 or more, the causing is performed in order to cause the generating unit to generate a single target file containing Y pages of image data representing Y pages of the original.

10. A non-transitory computer readable recording medium including a computer program for a controlling device configured to control a scan performing unit, the computer program including instructions for causing one or more processors mounted on the controlling device to perform:
determining a type of file format selected from a plurality of types of file format; and
causing the scan performing unit to perform a scan of an original so as to generate scan data in order to cause a generating unit to generate a target file of a generation target, the generating unit configured to generate the target file including the image data obtained using the scan data,
wherein, in a first case that the determined type of file format is a format having a page concept and that the scan performing unit is to perform a scan of Y pages of an original, where Y is integer of 2 or more, the causing the scan performing unit to perform the scan includes causing the generating unit to generate the target file including first image data obtained using the scan data, the first image data having a first resolution, and
wherein, in a second case that the determined type of file format is the format having a page concept and that the scan performing unit is to perform a scan of single page of an original, the causing the scan performing unit to perform the scan includes causing the generating unit to generate the target file including second image data obtained using the scan data, the second image data having a second resolution.

* * * * *